United States Patent
Hattori

(10) Patent No.: US 8,205,925 B2
(45) Date of Patent: Jun. 26, 2012

(54) VEHICLE BODY REINFORCING STRUCTURE

(75) Inventor: Nobuhiko Hattori, Hamamatsu (JP)

(73) Assignee: Suzuki Motor Corporation (JP)

( * ) Notice: Subject to any disclaimer, the term of this patent is extended or adjusted under 35 U.S.C. 154(b) by 0 days.

(21) Appl. No.: 13/093,903

(22) Filed: Apr. 26, 2011

(65) Prior Publication Data
US 2011/0266833 A1   Nov. 3, 2011

(30) Foreign Application Priority Data
Apr. 28, 2010   (JP) ................... 2010-104514

(51) Int. Cl.
*B62D 25/02* (2006.01)

(52) U.S. Cl. .......... 296/30; 296/187.09; 296/187.12; 296/193.06

(58) Field of Classification Search ........... 296/187.01, 296/187.03, 187.09, 187.1, 187.12, 193.01, 296/193.05, 193.06, 203.01, 193.09, 205, 296/203.02, 29, 30, 203.03
See application file for complete search history.

(56) References Cited

U.S. PATENT DOCUMENTS 6,447,052 B2 *  9/2002  Saeki ................. 296/187.09
7,140,674 B2 * 11/2006  Miyoshi et al. .......... 296/203.03
8,002,337 B2 *  8/2011  Baccouche et al. ...... 296/203.02

FOREIGN PATENT DOCUMENTS
JP  2005-075130  3/2005
* cited by examiner

*Primary Examiner* — Joseph Pape
(74) *Attorney, Agent, or Firm* — Myers Bigel Sibley & Sajovec, PA

(57) ABSTRACT

There is provided a vehicle body reinforcing structure capable of improving the structural durability of a side body against a load applied from the front and capable of connecting a front body and the side body more firmly to each other. In the vehicle body reinforcing structure including a side wall member 116 which is curved so as to be convex toward the vehicle body outside, and to which a front door is attached via a door hinge; a connecting member 112 for connecting the side wall member to the front portion of a vehicle body; and a reinforcing member 136 that is attached to the vehicle body inside of the side wall member along the up-and-down direction, is curved along the curved side wall member, and reinforces the side wall member, there are provided brace members (an upper brace member 142 and a lower brace member 144) each of which has a plane surface part, fits to the curved inner surface of the reinforcing member, and is configured so that the plane surface part extends in the vehicle body longitudinal direction; and bolts 122 and 124 for fastening the connecting member, the side wall member, the reinforcing member, and the brace member together.

6 Claims, 6 Drawing Sheets

SECTION C-C

SECTION A-A

SECTION B-B

VEHICLE BODY REINFORCING STRUCTURE

CROSS-RELATED APPLICATIONS

This application claims priority from Japanese Patent Application No. 2010-104514; filed Apr. 28, 2010, the disclosure of which is incorporated herein by reference in its entirety.

BACKGROUND OF THE INVENTION

The present invention relates to a vehicle body reinforcing structure between a front body and a side body of a vehicle body.

Generally, the vehicle body of a motor vehicle excluding openable portions such as an engine hood, doors, and the like, is called a body shell. The body shell can be divided broadly into a front body constituting the front portion of vehicle body, a rear body constituting the rear portion thereof, a side body constituting a side wall thereof, and an underbody constituting the lower surface thereof.

Among these bodies, the front body is the front end in the travel direction of the vehicle body, and is a portion liable to be subjected to a load from the front during running. When the front body is subjected to a load, the load is transmitted to portions at the rear of the front body. The front body is connected with the side body on the rear side thereof, and the load is concentrated particularly on the connecting location of the front body and the side body. Therefore, the connecting location is required to have a rigidity capable of withstanding the load.

Conventionally, in the connecting location of the front body and the side body, a connecting member called an outer member or an outer frame has been used. For example, Patent Document 1 (JP 2005-75130 A) discloses a vehicle body frame structure in which the front body and the side body are connected to each other by an outer frame member.

In Patent Document 1, the outer frame member is reinforced by fastening a body panel and a reinforcement member, which form the skeleton of a side body, and a door hinge upper part, which is provided at a door mounting position of these members, together by using bolts. Patent Document 1 describes that the endurance strength of a vehicle body can be improved by fastening the outer frame member to the above-described members together.

In Patent Document 1, the outer frame member is fixed to the front body and the side body so that the longitudinal direction thereof is substantially parallel with the longitudinal direction of the vehicle body. Therefore, it is thought that a load received by the side body from the front body in front of the side body via the outer frame member has a directivity substantially along the longitudinal direction of the vehicle body. In Patent Document 1, the side body in a location in which the outer frame member is fixed, that is, the body panel and the reinforcement member, and the door hinge upper part are members fabricated three-dimensionally by bending a sheet metal like the structure of a general vehicle body. For example, in FIG. 3 of Patent Document 1, the member such as the body panel is of a plate shape, and is curved so as to be convex toward the vehicle body outside. However, in such a curved configuration, it is difficult to think that a high rigidity can be achieved in the curved direction, so that the endurance strength of the body panel and the like against the load received from the outer frame member may be restricted structurally.

SUMMARY OF THE INVENTION

The present invention has been made to solve the above problem, and accordingly, an object thereof is to provide a vehicle body reinforcing structure capable of improving the structural durability of a side body against a load applied from the front and capable of connecting a front body and the side body more firmly to each other.

To achieve the above object, the present invention provides a vehicle body reinforcing structure including a side wall member which constitutes a side wall of a vehicle body and is curved so as to be convex toward the vehicle body outside, and to which a front door is attached via a door hinge; a connecting member for connecting the side wall member to the front portion of the vehicle body on the vehicle body outside of the side wall member; and a reinforcing member that is attached to the vehicle body inside of the side wall member along the up-and-down direction of the side wall member, is curved along the curved side wall member, and reinforces the side wall member, wherein the vehicle body reinforcing structure further includes a brace member that has a plane surface part, fits to the curved inner surface of the reinforcing member, and is configured so that the plane surface part extends in the vehicle body longitudinal direction; and a bolt for fastening the connecting member, the side wall member, the reinforcing member, and the brace member together.

By the above-described brace member, even if the reinforcing member is curved, the rigidity in the vehicle body longitudinal direction of the reinforcing member can be enhanced structurally. For the side wall member attached to the reinforcing member, the rigidity in the vehicle body longitudinal direction thereof is improved. By attaching the connecting member so that these members become integral, the front portion of the vehicle body (the front body) and the side body can be connected to each other by utilizing a highly rigid portion of the side wall (side body) of vehicle body. According to this configuration, even if receiving a load from the front body via the connecting member, the side body is not deformed, and the received load can be warded off further to the rear portion of the vehicle body, such as the front door and the rear door, via the door hinge. Thus, according to the above-described configuration, the structural durability of the side body against the load applied from the front is improved, and the front body and the side body can be fixed to each other more firmly.

In the above-described vehicle body reinforcing structure, it is preferable that two brace members, be provided; the door hinge be also attached to the reinforcing member together with the side wall member; and the two brace members each be attached to the vicinity above and below a mounting position of the door hinge on the curved inner surface of the reinforcing member.

According to the above-described brace member, the rigidities of the side wall member and the reinforcing member around the mounting position of the door hinge can be enhanced reliably. Therefore, even if receiving a load from the front portion of the vehicle body, the side wall member and the reinforcing member are not deformed at the mounting position of the door hinge, and therefore the mounting state of the door (the front door) can be maintained. Thereby, the load received by the side body from the front body is transmitted to the vehicle body rear not only via the side wall member and the reinforcing member but also via the front door. That is, the load received by the side body can be reduced in a process in which the load is transmitted from the front to the rear of the vehicle body.

It is preferable that the plane surface part of the brace member attached to the upper side of the mounting position of the door hinge extend horizontally in the vehicle body longitudinal direction; and the plane surface part of the brace member attached to the lower side of the mounting position of the door hinge extend in the longitudinal direction of a middle beam member for reinforcing a middle portion in the up-and-down direction of the front door.

According to the above-described configuration, the side wall member and the reinforcing member can transmit the load received from the front body to a location having an especially high rigidity on the front door. Thereby, the load can be transmitted to the vehicle body rear easily without deforming the front door.

It is preferable that the bolt fasten the connecting member, the side wall member, the reinforcing member, and the bracing member together from the vehicle body outside slantwise to the front at the vehicle body front position of the brace member. By the fastening with the bolt at the vehicle body front position, the brace member can be interposed in the path of the load transmitted from the connecting member 112 to the vehicle body rear via the bolt. Also, by inserting and tightening the bolt from the vehicle body outside slantwise to the front with respect to the above-described members, when the load is applied from the bolt to the members, the members are brought into contact with each other without shifting from each other, whereby the transmission efficiency of load is improved.

It is preferable that the brace member further have a rib that is provided at the outer edge of the plane surface part, and is in contact with the curved inner surface of the reinforcing member. According to this configuration, this rib can facilitate the fastening of the members using the bolt. Also, by combining the rib with the plane surface part, the brace member is formed into a three-dimensional shape, so that the rigidity is further improved. Further, the rib enlarges the contact area between the brace member and the reinforcing member, so that the brace member can reinforce the reinforcing member more easily.

DETAILED DESCRIPTION OF PREFERRED EMBODIMENTS

The present invention now will be described more fully hereinafter in which embodiments of the invention are provided with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs.

Figure 1:
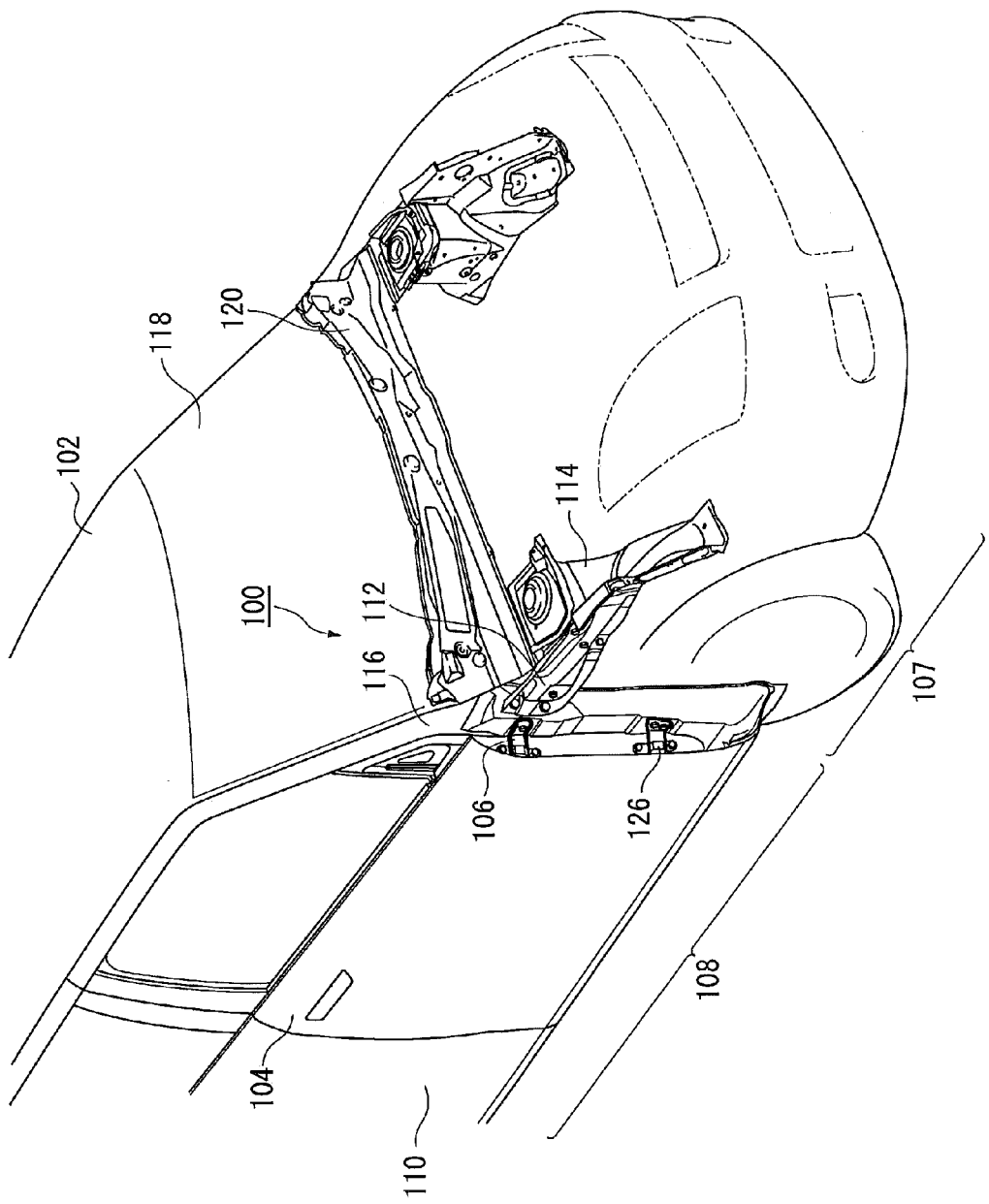
FIG. 1 is a perspective view of a vehicle body to which a vehicle body reinforcing structure in accordance with an embodiment of the present invention is applied.

FIG. 1 is a perspective view of a vehicle body 102 to which a vehicle body reinforcing structure 100 in accordance with this embodiment is applied. Hereunder, explanation is given by taking the vehicle body reinforcing structure 100 that is provided on the right side wall of the vehicle body 102 as shown in FIG. 1 as an example. On the left side wall of the vehicle body 102, there is provided a vehicle body reinforcing structure (not shown) symmetrical with the vehicle body reinforcing structure 100 on the right side wall and having the same function as that of the vehicle body reinforcing structure 100 on the right side wall.

The vehicle body reinforcing structure 100 in accordance with this embodiment connectingly fixes a front body 107 and a side body 108 to each other in the vicinity of a position at which an upper door hinge 106 in the up-and-down direction of a front door 104 of the vehicle body 102 is attached.

The front body 107 is a portion constituting the front portion of the vehicle body 102. The front body 107 is mounted with parts such as an engine and a front suspension, not shown. The front body 107 is the front end in the travel direction of the vehicle body 102, and is a portion liable to be subjected to a load from the front outside during running.

To the rear of the front body 107, the side body 108 is connected. The side body 108 is a portion constituting the side wall of the vehicle body 102. The side body 108 is mounted with the front door 104 and a rear door 110. The side body 108 and the front body 107 are connected to each other by welding, bolting, or like means in various locations. When the front body 107 is subjected to a load applied from the front, the load is liable to concentrate on these connecting locations.

The vehicle body reinforcing structure 100 in accordance with this embodiment has a connecting member 112 for connecting the side body 108 and the front body 107 to each other. Specifically, the connecting member 112 connectingly fixes a fender apron 114 of the front body 107 and a side wall member 116 of the side body 108 to each other. The connecting member 112 is provided in the vicinity on both sides in the vehicle width direction of a cowl 120 attached to under a windshield glass 118, and is also called a cowl side outer member.

Figure 2:
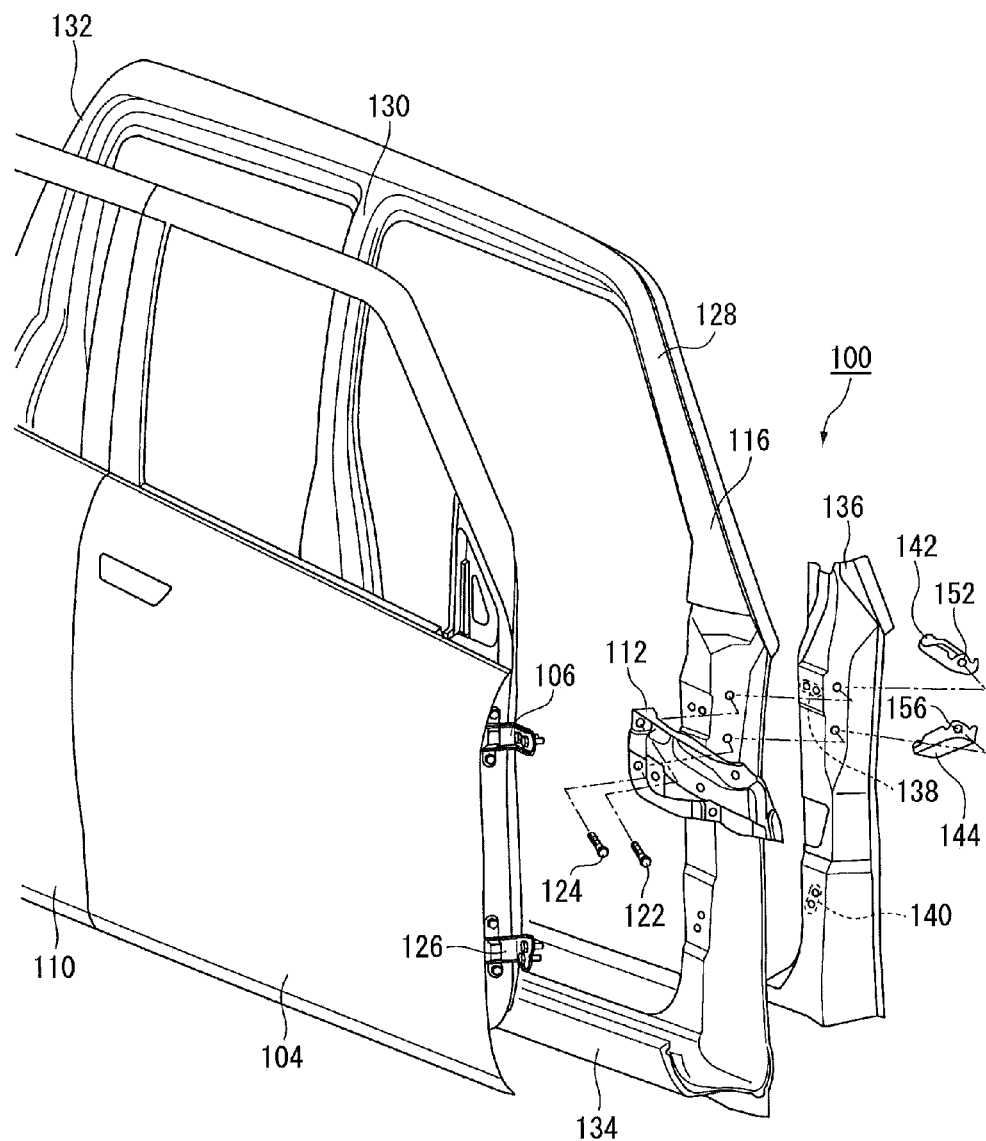
FIG. 2 is an exploded view of the vehicle body reinforcing structure shown in FIG. 1.

FIG. 2 is an exploded view of the vehicle body reinforcing structure 100 shown in FIG. 1. The connecting member 112 that the vehicle body reinforcing structure 100 is connected to the vehicle body outside of the side wall member 116 with bolts 122 and 124.

The side wall member 116 is also called a side body outer panel and functions as an outer panel of the side wall of the vehicle body 102 (FIG. 1). The side wall member 116 is mounted with the front door 104 and the rear door 110 on the vehicle body outside thereof. These doors are attached to the side wall member 116 so as to be openable and closable by door hinges. For example, the front door 104 is attached to the side wall member 116 via door hinges 106 and 126.

The side wall member 116 is formed with a plurality of pillars that serve as supporting members for supporting a roof (ceiling). The pillars consist of a front pillar 128, a center pillar 130, and a rear pillar 132 arranged from the front side of the vehicle body 102. In the lower portion of the side wall member 116 under each of the doors, a side sill serving as a doorsill at the time when a passenger gets on and off the vehicle is formed. The pillars including the front pillar 128 and the side sill 134 are important portions for supporting the whole of the vehicle body 102 and maintaining the rigidity thereof.

On the vehicle body inside of a region in which the door hinges 106 and 126 are attached of the side wall member 116, a reinforcing member 136 is provided. The reinforcing member 136 is a member for reinforcing the side wall member 116 so that the side wall member 116 can withstand the load received from the front door 104 via the door hinges 106 and 126. The reinforcing member 136 is attached to the vehicle body inside of the side wall member 116 along the up-and-down direction.

The reinforcing member 136 is provided with bolt holes 138 and 140 for attaching the door hinges 106 and 126. By using these bolt holes 138 and 140, the door hinges 106 and 126 are also attached to the reinforcing member 136 together with the side wall member 116. Thus, the reinforcing member 136 reinforces the region in which the door hinges 106 and 126 are attached of the side wall member 116. Therefore, the reinforcing member 136 is also called a hinge reinforcement.

In this embodiment, two brace members (an upper brace member 142 and a lower brace member 144) are attached to the vehicle body inside of the reinforcing member 136. These two brace members further reinforce the reinforcing member 136 and the side wall member 116 structurally.

Figure 3A:
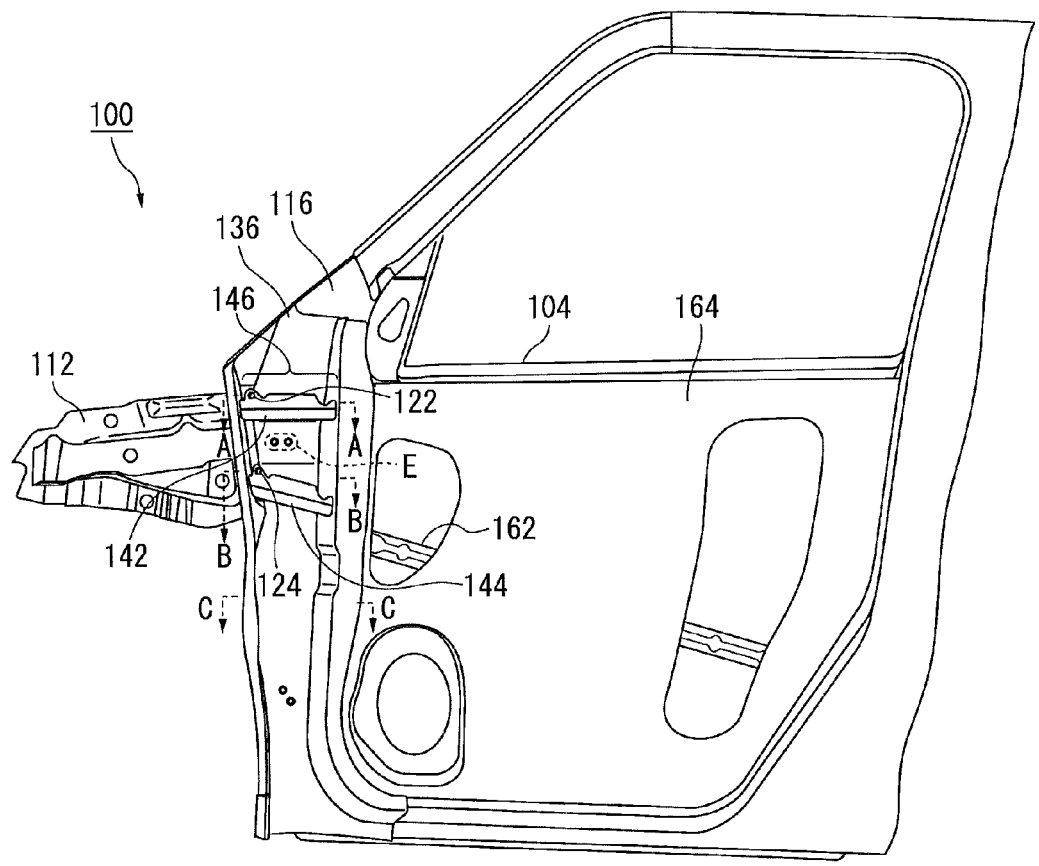
FIG. 3 is a side view and a sectional view of the vehicle body reinforcing structure shown in FIG. 1.
Figure 3B:
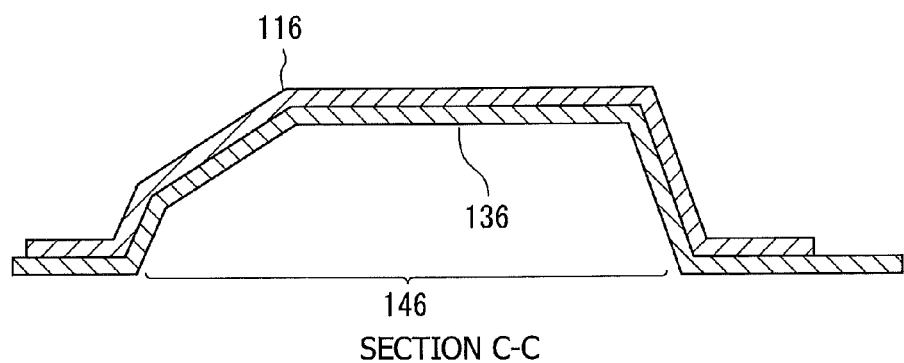

FIG. 3 is a side view and a sectional view of the vehicle body reinforcing structure 100 shown in FIG. 1. FIG. 3(*a*) is a side view of the vehicle body reinforcing structure 100 and the front door 104 shown in FIG. 1, as viewed from the vehicle body inside, and FIG. 3(*b*) is a sectional view taken along the line C-C of FIG. 3(*a*).

As shown in FIG. 3(*b*), the side wall member 116 and the reinforcing member 136 each are made of a metal, and are fabricated three-dimensionally by bending a sheet metal like the outer panel of a general vehicle body 102. For example, the side wall member 116 is fabricated three-dimensionally into a shape curved so as to be convex toward the vehicle body outside. The reinforcing member 136 is also fabricated three-dimensionally into a shape curved along the side wall member 116. Therefore, the surface on the vehicle body inside of the reinforcing member 136 is formed into a curved inner surface and depressed concavely (hereinafter, the curved inner surface is described as a concave part 146). The upper brace member 142 and the lower brace member 144 shown in FIG. 3(*a*) are provided so as to fit in the concave part 146.

Figure 4:
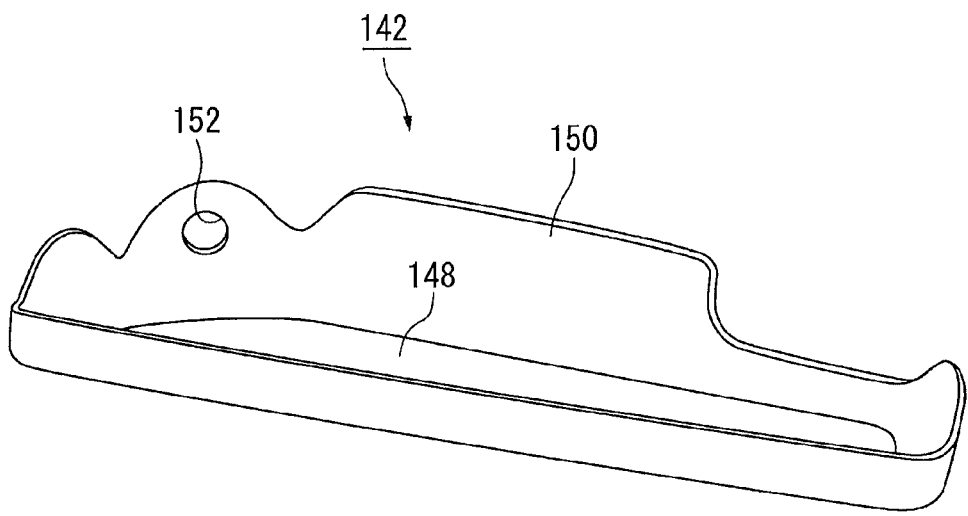
FIG. 4 is a perspective view of an upper brace member shown in FIG. 3.

FIG. 4 is a perspective view of the upper brace member 142 shown in FIG. 3(*a*). As shown in FIG. 4, the upper brace member 142 is made of a metal, and has a longitudinal plane surface part 148 spreading in a plane shape. At the outer edge of the plane surface part 148, a rib 150 is provided. By combining the rib 150 with the plane surface part 148, the upper brace member 142 is formed into a three-dimensional shape. Thereby, the upper brace member 142 has a further improved rigidity especially in the vehicle body longitudinal direction.

A bolt hole 152 is provided in a vehicle body front portion (the left-hand side in FIG. 4) of the rib 150. By providing the bolt hole 152 in the rib 150, the members can be fastened together easily by using the bolt 122, described later.

Referring to FIG. 3(*a*) again, the upper brace member 142 extends horizontally so that the longitudinal direction of the plane surface part 148 coincides with the longitudinal direction of the vehicle body 102, and is attached to the concave part 146 of the reinforcing member 136. Also, the rib 150 of the upper brace member 142 is in contact with the concave part 146. The rib 150 can enlarge the contact area between the upper brace member 142 and the reinforcing member 136. Also, in the bolt hole 152 provided in the rib 150, the bolt 122 is inserted.

Figure 5:
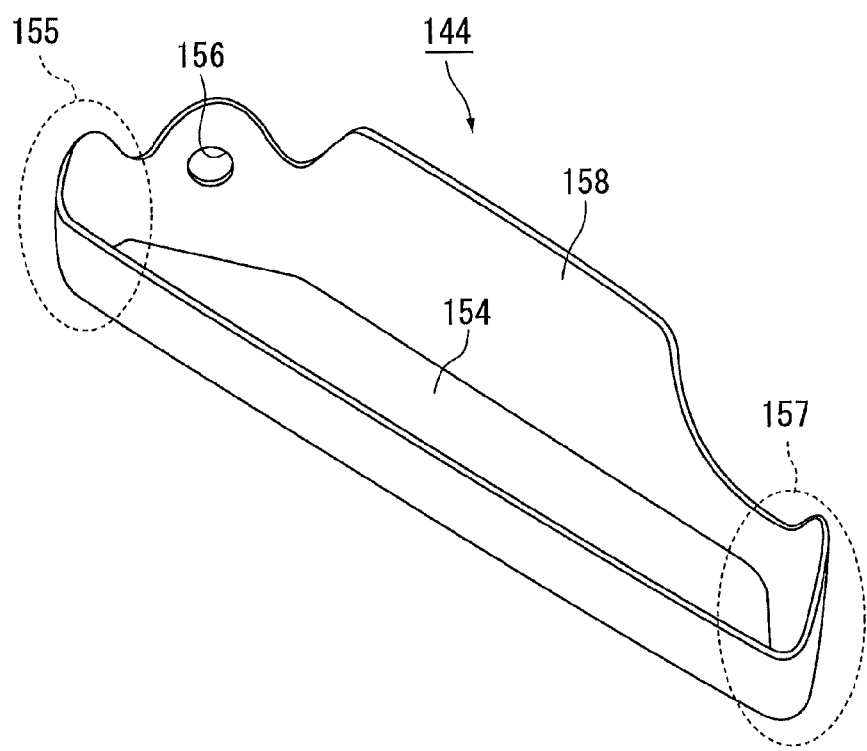
FIG. 5 is a perspective view of a lower brace member shown in FIG. 3.

FIG. 5 is a perspective view of the lower brace member 144 shown in FIG. 3(*a*). As shown in FIG. 5, like the upper brace member 142, the lower brace member 144 is made of a metal, and has a longitudinal plane surface part 154 spreading in a plane shape. Also, at the outer edge of the plane surface part 154 of the lower brace member 144 as well, a rib 158 having a bolt hole 156 in a vehicle body front portion is provided. By combining the rib 158 with the plane surface part 154, the lower brace member 144 is formed into a three-dimensional shape. Thereby, like the upper brace member 142, the lower brace member 144 also has a further improved rigidity in the vehicle body longitudinal direction. Also, by providing the bolt hole 156 in the rib 158, the members can be fastened together easily by using the bolt 124, described later.

For the lower brace member 144, in an end part 155 (the vehicle body front side (the left-hand side in FIG. 5)) that is an end in the longitudinal direction of the plane surface part 154 and an end part 157 (the vehicle body rear side (the right-hand side in FIG. 5)), the rib 158 is provided so as to tilt with respect to the plane surface part 154. In this respect, the lower brace member 144 differs from the upper brace member 142.

Referring to FIG. 3(*a*) again, the lower brace member 144 is attached slantwise to the reinforcing member 136 with the vehicle body rear side being located in a lower portion. This is because the lower brace member 144 is attached so as to be substantially parallel with the longitudinal direction of a middle beam member 162 of the front door 104 as described later. At this time, because the rib 158 of the lower brace member 144 is provided so as to tilt with respect to the plane surface part 154 as described above, even if the lower brace member 144 is attached slantwise to the reinforcing member 136, the rib 158 can be in contact with the concave part 146. Thereby, the rib 158 can enlarge the contact area between the lower brace member 144 and the reinforcing member 136. In the bolt hole 156 provided in the rib 158, the bolt 124 is inserted.

The upper brace member 142 and the lower brace member 144 may be attached to the reinforcing member 136 not only by using the bolts 122 and 124 but also by spot welding or like means.

FIG. 6 is sectional views of FIG. 3(*a*). FIG. 6(*a*) is a sectional view taken along the line A-A of FIG. 3(*a*). As shown in FIG. 6(*a*), the reinforcing member 136 is curved so as to be convex toward the side wall member 116. However, the reinforcing member 136 is provided with the upper brace member 142 in the concave part 146, and the upper brace member 142 functions as a propping member, whereby the rigidity of the reinforcing member 136 in the longitudinal direction of the vehicle body 102 (the right-and-left direction in FIG. 6(*a*)) can be enhanced structurally. At this time, because the contact area between the upper brace member 142 and the reinforcing member 136 is enlarged by the rib 150, the upper brace member 142 can reinforce the reinforcing member 136 more easily.

Figure 6A:
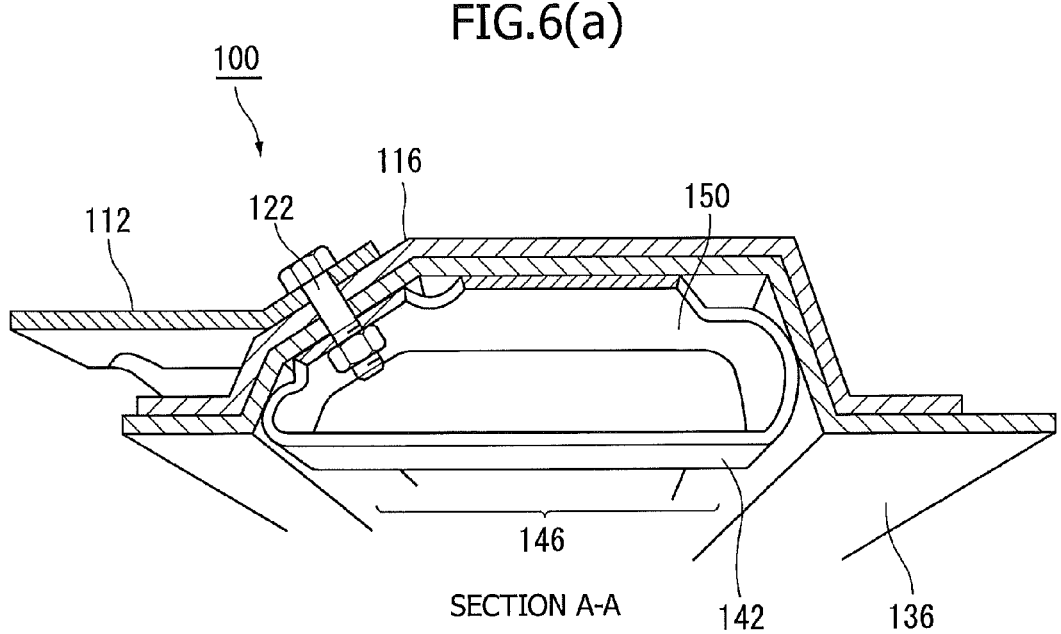
FIG. 6 is sectional views of FIG. 3.
Figure 6B:
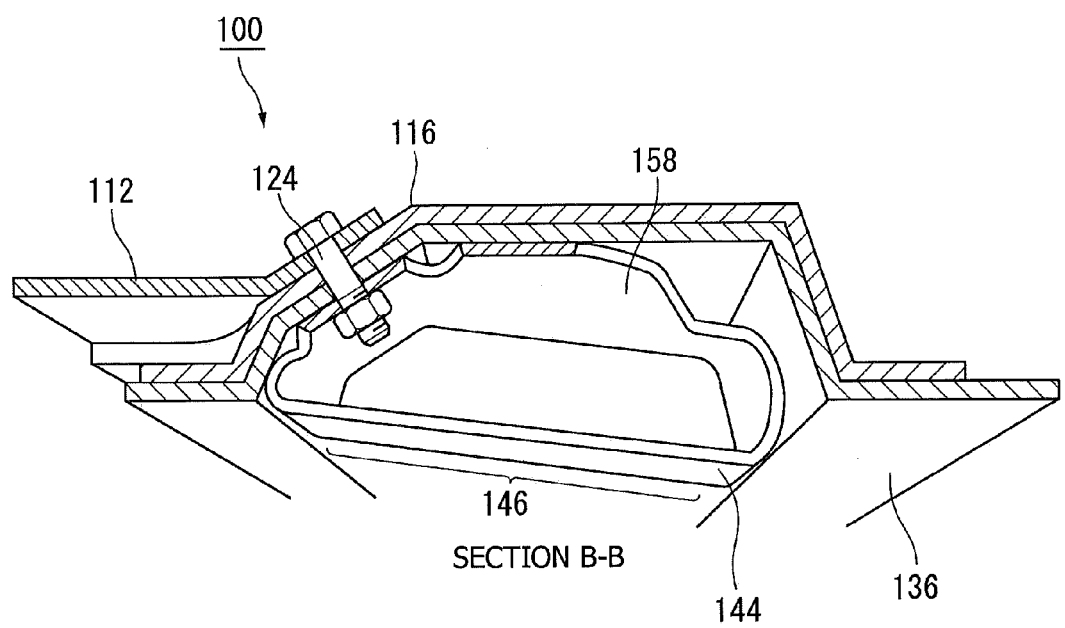

FIG. 6(b) is a sectional view taken along the line B-B of FIG. 3(a). As shown in FIG. 6(b), the lower brace member 144 is provided in the concave part 146 to function as a propping member, whereby the rigidity of the reinforcing member 136 in the longitudinal direction of the vehicle body 102 (the right-and-left direction in FIG. 6(a)) can be enhanced structurally. Also, for the lower brace member 144 as well, because the contact area between the lower brace member 144 and the reinforcing member 136 is enlarged by the rib 158, the lower brace member 144 can reinforce the reinforcing member 136 more easily. By the reinforcing member 136 to which the upper brace member 142 and the lower brace member 144 are attached, the rigidity of the side wall member 116 in the longitudinal direction of the vehicle body 102 is enhanced.

As shown in FIG. 6(a), the bolt 122 is inserted through the connecting member 112, the side wall member 116, the reinforcing member 136, and the upper brace member 142 in that sequence from the vehicle body outside of the vehicle body reinforcing structure 100, and thereby these members are fastened together. Also, as shown in FIG. 6(b), the bolt 124 is inserted through the connecting member 112, the side wall member 116, the reinforcing member 136, and the lower brace member 144 in that sequence from the vehicle body outside of the vehicle body reinforcing structure 100, and thereby these members are fastened together.

The fastening of these members using the bolts 122 and 124 is performed from the vehicle body outside slantwise to the front at the vehicle body front position of the upper brace member 142 and the lower brace member 144. Usually, if the members are merely fastened together by the bolts, the bolts are inserted in perpendicular to the members from the vehicle body outside. In this case, however, the load from the front body 107 to the members via the bolt is applied to the direction perpendicular to the bolt axis, that is, the shearing direction with respect to the surfaces of the members. In such a configuration, the load from the bolt to the members is less liable to be transmitted, and the members shift from each other in the shearing direction. In this embodiment, therefore, by tightening the bolts 122 and 124 from the vehicle body outside slantwise to the front as described above, when the load is applied from the bolt 122, 124 to the members, the members are brought into contact with each other without shifting from each other, whereby the transmission efficiency of load is improved.

Also, by the fastening with the bolt 122, 124 at the vehicle body front position, the upper brace member 142 and the lower brace member 144 can be interposed in the path of the load transmitted from the connecting member 112 to the vehicle body rear via the bolt 122, 124. By attaching the connecting member 112 so as to be integral with the members as described above, the connecting member 112 can connect the front body 107 and the side body 108 to each other by utilizing a portion having a higher rigidity of the side body 108 (FIG. 1).

According to the above-described configuration, even if receiving a load from the front body 107 via the connecting member 112, the side body 108 shown in FIG. 1 is not deformed, and scarcely absorbs the load. Therefore, the received load can be warded off further to the rear portion of the vehicle body 102, such as the front door 104 and the rear door 110, via the door hinges 106 and 126. Thus, according to the vehicle body reinforcing structure 100 in accordance with this embodiment, the structural durability of the side body 108 against the load applied from the front is improved, and the front body 107 and the side body 108 can be fixed to each other more firmly.

Referring to FIG. 3(a) again, an additional effect of the vehicle body reinforcing structure 100 in accordance with this embodiment is explained. As shown in FIG. 3(a), the upper brace member 142 and the lower brace member 144 each are attached to the vicinity above and below a mounting position E of the door hinge 106 including the bolt holes 138 (FIG. 2). Specifically, the upper brace member 142 is attached to the upper side of the mounting position E of the door hinge 106, and the lower brace member 144 is attached to the lower side of the mounting position E of the door hinge 106.

According to the above-described upper brace member 142 and lower brace member 144, the rigidities of the side wall member 116 and the reinforcing member 136 around the mounting position E of the door hinge 106 can be enhanced reliably. Therefore, even if receiving a load from the front body 107, the side wall member 116 and the reinforcing member 136 are not deformed at the mounting position E of the door hinge 106, and therefore the door (the front door 104) can be kept in the same mounting state as that before the load is received.

By the above-described configuration, the load received by the side body 108 can be reduced in a process in which the load is transmitted from the front to the rear of the vehicle body 102. For example, when the side body 108 receives a load from the front body 107, if the front door 104 has moved or removed from the usual mounting position, the load moving on the side body 108 (especially, on the side wall member 116) toward the rear is transmitted concentratedly to the front pillar 128 and the side sill 134. However, by keeping the mounting state of the front door 104 as described above, the load received by the side body 108 from the front body 107 is also transmitted to the front door 104 from the contact point between the door hinge 106 and side wall member 116 and the front door 104. That is, the load received by the side body 108 from the front body 107 is transmitted to the rear of the vehicle body 102 not only via the side wall member 116 and the reinforcing member 136 but also via the front door 104.

Figure 7:
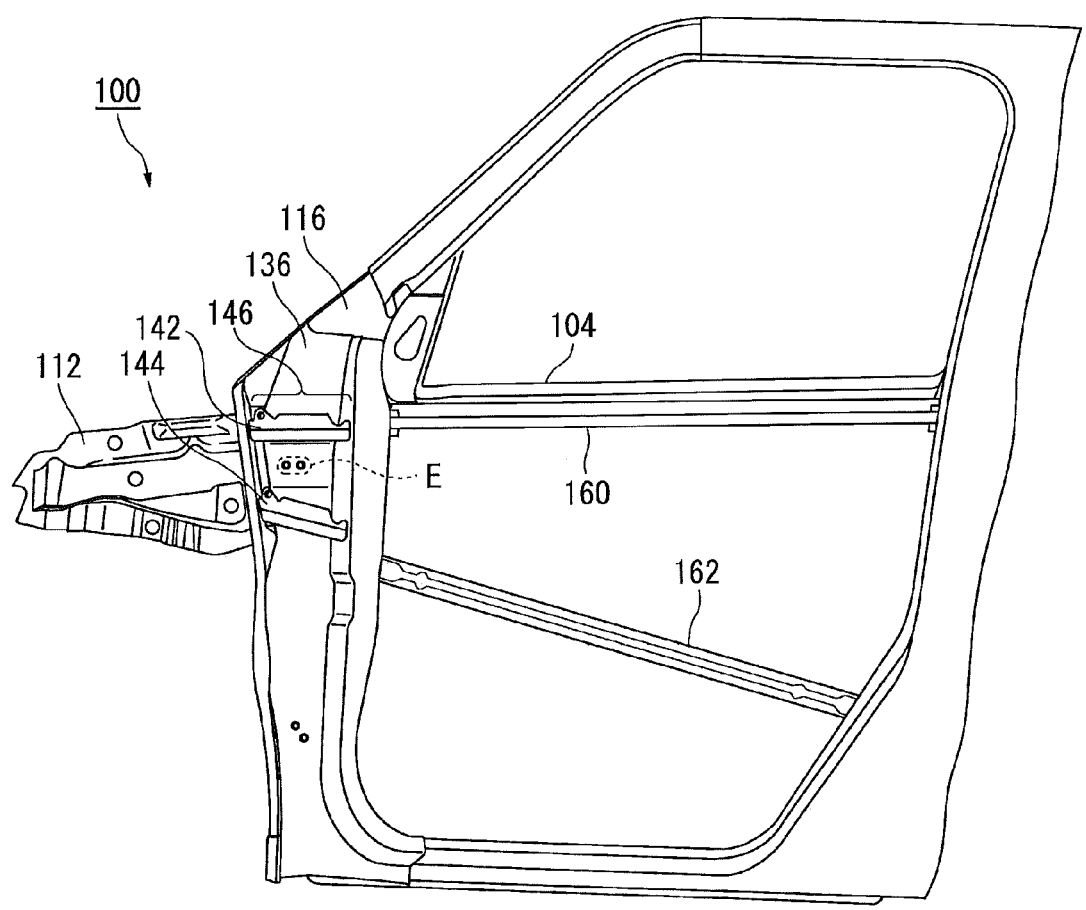
FIG. 7 is a side view in which a front door inner panel is omitted from FIG. 1

FIG. 7 is a side view in which a front door inner panel 164 is omitted from FIG. 3(a). Usually, in the front door 104, a plurality of beam members are provided to reinforce the front door 104. For example, as shown in FIG. 7, the front door 104 is provided with an upper beam member 160 for reinforcing the upper portion of the front door 104 and the middle beam member 162 for reinforcing the middle portion in the up-and-down direction thereof. The upper beam member 160 is provided substantially in parallel with the longitudinal direction of the vehicle body 102. The middle beam member 162 is provided slantwise with the rear side of the vehicle body 102 (the right direction side in FIG. 7) being located in a lower portion. These beam members serve as supporting members, so that the rigidity of the front door 104 is enhanced especially in the longitudinal direction of the beam members.

As shown in FIG. 7, the upper brace member 142 is not only attached on the upper side of the mounting position E of the door hinge 106 but is also attached so that the longitudinal direction of the plane surface part 148 is substantially parallel with the longitudinal direction of the upper beam member 160 for reinforcing the upper portion of the front door 104. Also, the lower brace member 144 is not only attached on the lower side of the mounting position E of the door hinge 106 but is also attached slantwise, and extends so that the plane surface part 154 is substantially parallel with the longitudinal direction of the middle beam member 162 for reinforcing the middle portion in the up-and-down direction of the front door 104.

According to the above-described configuration, the side wall member 116 and the reinforcing member 136 can transmit the load received from the front body 107 to a location having an especially high rigidity on the front door 104. Therefore, even if the load is transmitted to the front door 104, the load can be transmitted further to the vehicle body rear easily without deforming the front door 104.

The above is an explanation of a preferred embodiment of the present invention with reference to the accompanying drawings. Needless to say, the present invention is not limited to the above-described embodiment. It is apparent that any person skilled in the art can think of various changes and modifications in the scope described in the claims, and it is understood that these changes and modifications naturally belong to the technical scope of the present invention.

The present invention can be applied to the vehicle body reinforcing structure between the front body and the side body of vehicle body.

Having thus described certain embodiments of the present invention, it is to be understood that the invention defined by the appended claims is not to be limited by particular details set forth in the above description as many apparent variations thereof are possible without departing from the spirit or scope thereof as hereinafter claimed. The following claims are provided to ensure that the present application meets all statutory requirements as a priority application in all jurisdictions and shall not be construed as setting forth the full scope of the present invention.

What is claimed is:

1. A vehicle body reinforcing structure comprising:
   a front body which constitutes a front portion of a vehicle body;
   a side wall member which constitutes a part of a side wall of the vehicle body and is curved so as to be convex toward the vehicle body outside, and to which a front door is attached via a door hinge;
   a connecting member disposed on an outer surface of the side wall member and for connecting the side wall member to the front body;
   a reinforcing member, which is attached to the vehicle body inside of the side wall member along an up-and-down direction of an attachment region of the door hinge of the side wall member, is curved along the curved side wall member, and reinforces the side wall member;
   two brace members, which have a plane surface part and a surface that is curved so as to be concave on the vehicle body inner side of the reinforcing member, fit to the inner surface of the concave portion, and are configured so that the plane surface part of each of the brace members extends in the vehicle body longitudinal direction; and
   a bolt for fastening the connecting member, the side wall member, the reinforcing member, and the brace members together,
   wherein the door hinge is also attached to the reinforcing member together with the side wall member; and
   wherein an upper brace member of the two brace members is attached to the vicinity of an upper side of a mounting position of the door hinge and a lower brace member of the two brace members is attached to the vicinity of a lower side of the mounting position of the door hinge, on the inner surface of the reinforcing structure that is curved so as to be concave.

2. The vehicle body reinforcing structure according to claim 1, further comprising a middle beam member for reinforcing a middle portion in an up-and-down direction of the front door slantwise in the vehicle body longitudinal direction, wherein the plane surface part of the upper brace member attached to the vicinity of the upper side of the mounting position of the door hinge in the vehicle body longitudinal direction extends horizontally in the vehicle body longitudinal direction; and
   the plane surface part of the lower brace member attached to the vicinity of the lower side of the mounting position of the door hinge in the vehicle body longitudinal direction extends in the longitudinal direction of the middle beam member for reinforcing the middle portion in the up-and-down direction of the front door slantwise in the vehicle body longitudinal direction.

3. The vehicle body reinforcing structure according to claim 1, wherein the bolt fastens the connecting member, the side wall member, the reinforcing member, and the brace member together from the vehicle body outside slantwise to the front at the front side position of the upper brace member.

4. The vehicle body reinforcing structure according to claim 2, wherein a rib is provided at the outer edge of the plane surface part of the upper brace member, and the rib is in contact with the curved inner surface of the reinforcing member.

5. The vehicle body reinforcing structure according to claim 1, wherein the bolt fastens the connecting member, the side wall member, the reinforcing member, and the lower brace member together from the vehicle body outside slantwise to the front at the front side position of the lower brace member.

6. The vehicle body reinforcing structure according to claim 5, wherein a rib is provided at the outer edge of the plane surface part of the lower brace member, and the rib is in contact with the curved inner surface of the reinforcing member.

* * * * *